United States Patent
Miyashita

(10) Patent No.: US 7,371,001 B2
(45) Date of Patent: May 13, 2008

(54) LIGHT GUIDE PLATE

(75) Inventor: Junji Miyashita, Fujiyoshida (JP)

(73) Assignee: Citizens Electronic Co., Ltd. (JP)

( * ) Notice: Subject to any disclaimer, the term of this patent is extended or adjusted under 35 U.S.C. 154(b) by 0 days.

(21) Appl. No.: 11/498,485

(22) Filed: Aug. 3, 2006

(65) Prior Publication Data

US 2007/0030698 A1    Feb. 8, 2007

(30) Foreign Application Priority Data

Aug. 3, 2005 (JP) .............................. 2005-224788

(51) Int. Cl.
*F21V 7/04* (2006.01)
(52) U.S. Cl. .................. 362/626; 362/623; 362/625
(58) Field of Classification Search ................ 362/600, 362/602, 612, 613, 615, 621, 622, 623, 624, 362/625, 626, 627, 628, 330, 339; 385/129, 385/147, 901
See application file for complete search history.

(56) References Cited

U.S. PATENT DOCUMENTS 5,420,761 A * 5/1995 DuNah et al. .............. 362/623
5,485,291 A * 1/1996 Qiao et al. ................. 362/615
6,256,447 B1 * 7/2001 Laine ........................ 385/146
2001/0013976 A1    8/2001 Hirayama et al.

FOREIGN PATENT DOCUMENTS

JP    2002-042529    2/2002

* cited by examiner

*Primary Examiner*—Y. My Quach-Lee
(74) *Attorney, Agent, or Firm*—Brinks Hofer Gilson & Lione

(57) ABSTRACT

A light guide plate includes a top surface serving as a light-emitting surface, a bottom surface serving as a reflecting surface, and a periphery having a first side surface serving as an incident surface and a second side surface opposite the first side surface. The bottom surface is provided with reflecting prisms successively arranged in a direction from the first to second side surface. Each reflecting prism has a first slant surface and a second slant surface succeeding to the first slant surface. The first slant surface extends toward the top surface in a direction from the first side surface toward the second side surface and the second slant surface extends away from the top surface in the same direction. The second slant surface is formed such that a large part of light reflected back from the second side surface toward the first side surface is emitted from an area of the top surface near the first side surface.

6 Claims, 5 Drawing Sheets

LIGHT GUIDE PLATE

This application claims priority under 35 U.S.C. §119 to Japanese Patent Application No. JP2005-224788 filed Aug. 3, 2005, the entire content of which is hereby incorporated by reference.

BACKGROUND

1. Field of Invention

The present invention relates to a light guide plate included in a backlight unit for illuminating a compact liquid-crystal display device mounted on a portable apparatus, such as a mobile phone or a personal digital assistant.

2. Description of the Related Art

Recently, a liquid-crystal display device is mounted on various electronic apparatuses, such as watches, phones, and personal computers. Of such electronic apparatuses, watches and mobile phones, which are used at night and in dark places, often include a backlight unit for illuminating the liquid-crystal display device. Backlight units are broadly divided into two types, direct type and edge light type. A direct-type backlight unit includes a liquid-crystal display plate, a light source, and a light diffusion plate interposed therebetween. In an edge-light-type backlight unit, a liquid-crystal display plate and a light guide plate are disposed opposite each other, and a light source is disposed adjacent to the light guide plate such that light enters the light guide plate from the periphery thereof. An exemplary edge-light-type backlight unit is disclosed, for example, in Japanese Unexamined Patent Application Publication No. 2002-42529.

As compared to the direct-type backlight unit, the edge-light-type backlight unit is advantageous in that it can have a reduced thickness and can reduce the effects of heat from the light source on the liquid-crystal display panel.

FIG. 6A, FIG. 6B, and FIG. 7 illustrate an edge-light-type backlight unit. FIG. 6A is a plan view of the edge-light-type backlight unit and FIG. 6B is a cross-sectional view taken along line VIB-VIB of FIG. 6A. FIG. 7 illustrates an optical path of light emitted from a light source of the backlight unit.

As illustrated, a light guide plate 2 and four light-emitting diodes (hereinafter referred to as "LEDs") 3 are disposed inside a housing 1 of the backlight unit. The light guide plate 2 is a clear rectangular plate made of plastic. The LEDs 3 are disposed adjacent to a side surface 2a serving as an incident surface of the light guide plate 2. Light emitted from the LEDs 3 enters the light guide plate 2 from the side surface 2a and propagates inside the light guide plate 2 while being repeatedly reflected on a bottom surface 2b and a top surface 2c of the light guide plate 2. When, as illustrated, the bottom surface 2b of the light guide plate 2 is provided with many reflecting prisms having slant surfaces with angles P, the incident angle of light from the LEDs 3 with respect to the top surface 2c serving as a light-emitting surface gradually decreases as the light propagates while repeatedly being reflected on the top surface 2c and the bottom surface 2b. When the incident angle becomes smaller than a predetermined critical angle, the light is emitted from the light-emitting surface to the outside. While part of illuminating light is emitted through the bottom surface 2b to the outside, the light is reflected by a reflecting sheet 4, such as a silver glossy sheet or a white sheet, back to the light guide plate 2. Light emitted from the top surface 2c of the light guide plate 2 is directed by a prism sheet 5 toward a liquid crystal panel (not shown).

However, as illustrated in FIG. 9, there are dark areas 7 on the top surface 2c of the light guide plate 2 in the known backlight unit. The dark areas 7 are adjacent to spaces between the LEDs 3. The amount of light emitted from the top surface 2c is extremely small in the dark areas 7.

One reason for this is that light emitted from each LED 3 has directivity. In other words, light from each LED 3 radiates out with an emitting direction centered, and the amount of light decreases as a radiation angle $\theta$ such as that illustrated in FIG. 6A increases.

Another reason for the occurrence of the dark areas 7 is that when the radiation angle $\theta$ exceeds a certain value, the effects of the slant surfaces of the reflecting prisms are virtually cancelled out. Specifically, as described above, the slant surfaces of the reflecting prisms reflect the light from the LED 3 to make the incident angle of the light to the top surface 2c smaller so that the light is eventually emitted through the top surface 2c to the outside when the incident angle of the light to the top surface 2c becomes smaller than a predetermined critical angle. However, since the angle of a slant surface of a reflecting prism with respect to the light decreases as the radiation angle $\theta$ increases, the above-described effects of the slant surfaces of the reflecting prisms are virtually cancelled out when the radiation angle $\theta$ exceeds a certain value. FIG. 8 illustrates a ratio of the angle of the slant surface with respect to light incident on the slant surface at a radiation angle $\theta$ relative to the angle of the slant surface with respect to light incident on the slant surface in the emitting direction of an LED, i.e., at the angle $\theta$ of zero.

BRIEF SUMMARY

The present invention has been made in view of the aspects described above, and an object thereof is to solve the problem of dark areas that appear on the light guide plate and near LEDs.

According to an aspect of the present invention, a light guide plate includes a top surface serving as a light-emitting surface; a bottom surface serving as a reflecting surface; and a periphery having a first side surface serving as an incident surface and a second side surface opposite the first side surface, wherein the bottom surface is provided with a plurality of reflecting prisms successively arranged in a direction from the first side surface to the second side surface; each reflecting prism has a first slant surface inclined so as to extend toward the top surface in a direction from the first side surface toward the second side surface, and a second slant surface succeeding to the first slant surface and inclined so as to extend away from the top surface in the direction from the first side surface toward the second side surface; and the second slant surfaces of reflecting prisms are designed to reflect a large part of light reflected back from the second side surface toward the first side surface so that the large part of light is emitted from an area of the top surface located near the first side surface.

In this light guide plate, light entering into the first side surface serving as an incident surface advances toward the second side surface and is gradually emitted from the light-emitting surface by the reflecting prisms. Further, some of the light which will be reflected back from the second side of the light guide plate and a large part of the light is emitted from a portion located on the light-emitting surface near the first side surface. This can solve or reduce the problem of dark areas generated on the light-emitting surface of the known light guide plate described above. Here, the term "a large part" in "a large part of the returned light" noted above is used as compared with that in the known light guide plate as discussed above.

Specifically, the inclination angles of the second slant surfaces of the reflecting prisms positioned near the first side surface are made larger than those of the second slant surfaces of other reflecting prisms so that the large part of light reflected back from the second side surface toward the first side surface is emitted from the area of the top surface located near the first side surface.

Further, the inclination angle of the second slant surface of a reflecting prism may decrease as a distance between the second slant surface and the first side surface increases.

Furthermore, the inclination angle of the first slant surface of a reflecting prism may increase as a distance between the first slant surface and the first side surface increases.

The reflecting prisms may be configured in parallel with the first side surface.

The reflecting prisms may formed to satisfy the following conditions:

$$A(1)<A(2)<\cdots A(m-1)<A(m)\cdots A(n-1)<A(n)$$

$$B(1)<B(2)<\cdots B(m-1)<B(m)\cdots B(n-1)<B(n)$$

$$A(m)=B(m)$$

wherein $A(m)$ represents the inclination angle of the first slant surface of the m-th reflecting prism from the first side surface toward the second side surface, $B(m)$ represents the inclination angle of the second slant surface of the m-th reflecting prism from the second side surface toward the first side surface. The number of the reflecting prisms formed between the first side surface and the second side surface is "n".

Further, a reflective film may be formed on the second side surface for reflecting light to return to the first side surface.

In the present invention, a large part of light returned through the second side surface toward the first side surface serving as an incident surface is emitted from an area of the light-emitting surface near the first side surface. Therefore, the problem of dark areas generated on the light-emitting surface near the incident surface of the known light guide plate described above can be solved or reduced.

DETAILED DESCRIPTION OF THE PREFERRED EMBODIMENTS

A light guide plate according to embodiments of the present invention will now be described with reference to FIGS. 1A through 5.

Figure 6A:
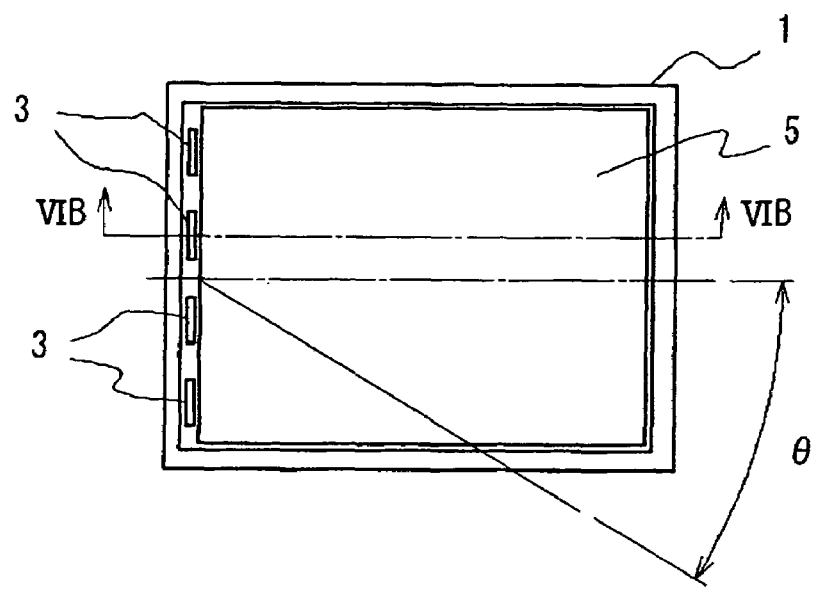
FIG. 6A is a plan view of a substantial part of a known backlight unit.
Figure 6B:
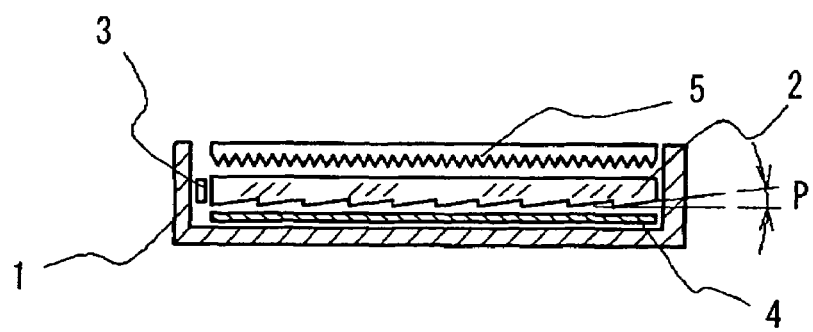
FIG. 6B is a cross-sectional view taken along line VIB-VIB of FIG. 6A.
Figure 7:
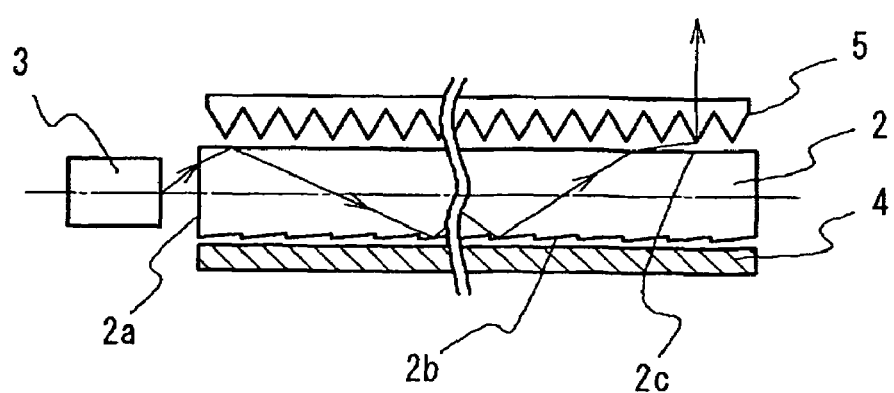
FIG. 7 is a cross-sectional view of the known backlight unit and illustrates an optical path of light emitted from a light source.
Figure 8:
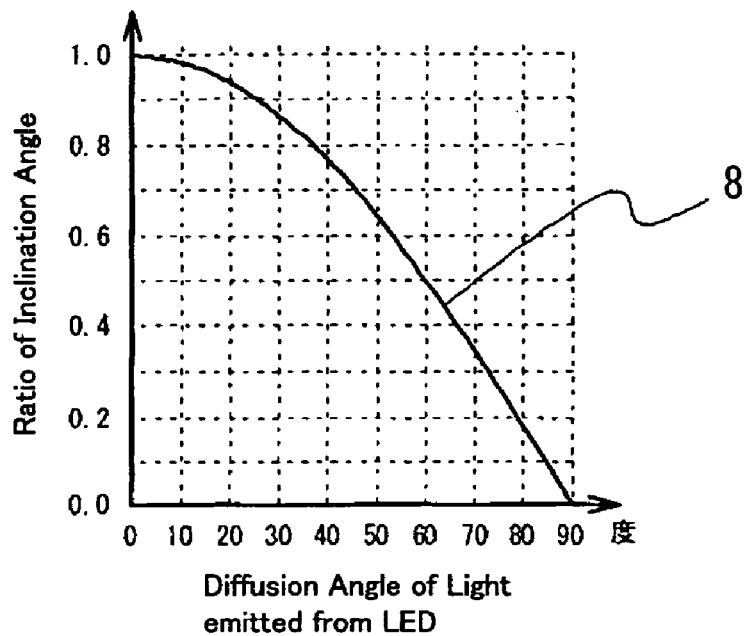
FIG. 8 is a graph showing a relationship between a radiation angle from the incident direction of light having entered a light guide plate, and the angle of a slant surface of a prism with respect to light incident on the slant surface.
Figure 9:
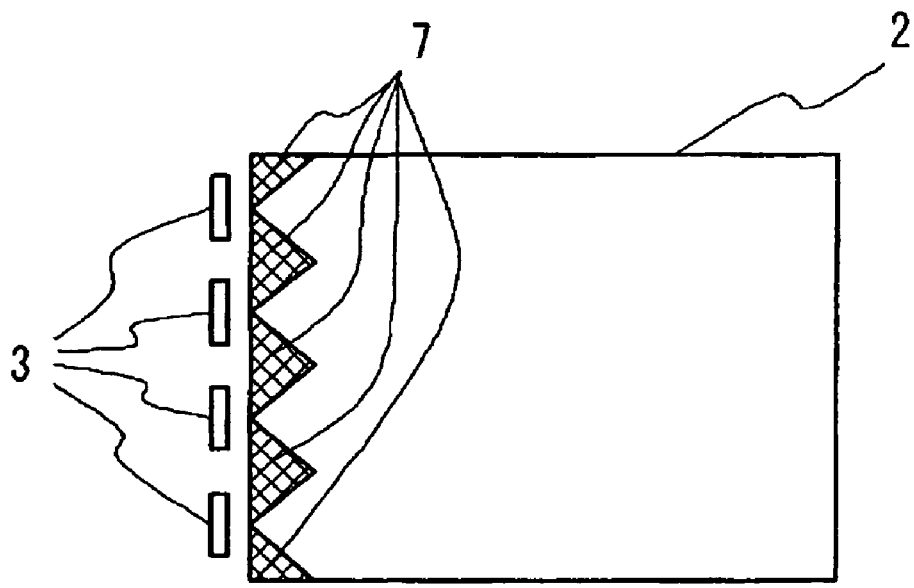
FIG. 9 illustrates dark areas generated in a portion of a light-emitting surface of the known light guide plate, the portion being adjacent to an incident surface of the light guide plate.

Similar to the light guide plate in the known backlight unit described with reference to FIGS. 6A and 6B, a light guide plate 12 of the present invention is generally flat in shape.

Figure 1A:
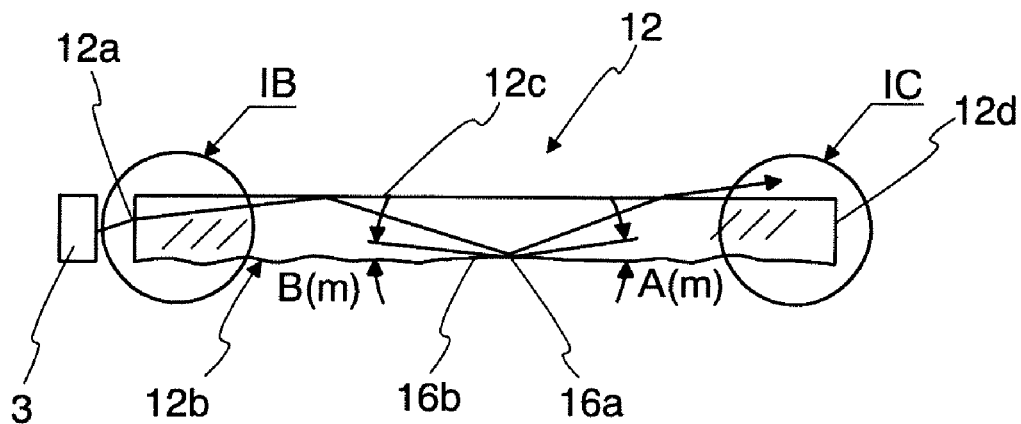
FIG. 1A is a side view of a light guide plate according to an embodiment of the present invention.
Figure 1B:
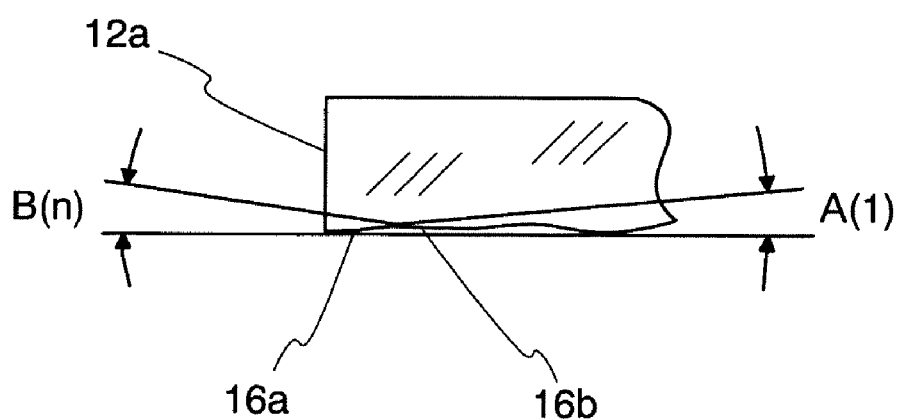
FIG. 1B is an enlarged view of portion IB of FIG. 1A.
Figure 1C:
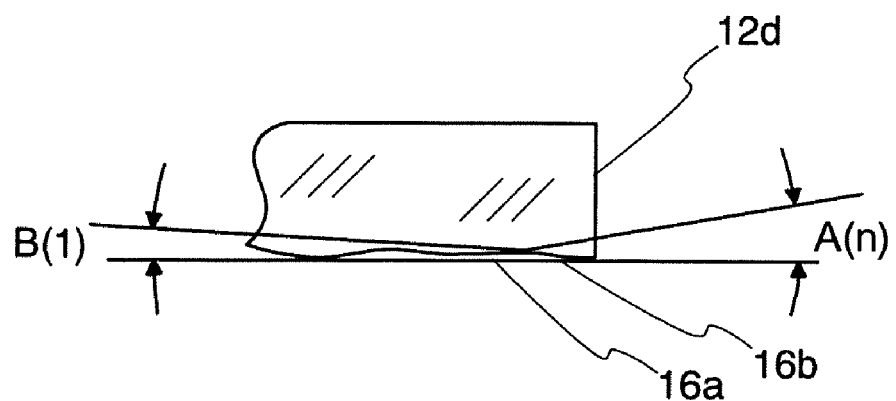
FIG. 1C is an enlarged view of portion IC of FIG. 1A.

FIG. 1A is a side view of the light guide plate 12. FIG. 1B is an enlarged view of portion IB of FIG. 1A. FIG. 1C is an enlarged view of portion IC of FIG. 1A.

As illustrated, the light guide plate 12 includes a top surface 12c serving as a light-emitting surface, a bottom surface 12b serving as a reflecting surface, and a periphery having a first side surface 12a serving as an incident surface and a second side surface 12d opposite the first side surface 12a.

The bottom surface 12b is provided with a plurality of reflecting prisms successively arranged in a direction from the first side surface 12a to the second side surface 12d. Each of the reflecting prisms extends in parallel with the first side surface 12a and second side surface 12d to form a sawtooth pattern.

Each reflecting prism has a first slant surface 16a and a second slant surface 16b right next to the first slant surface 16a. The first slant surface 16a is slant so as to extend toward the top surface 12c in a direction from the first side surface 12a toward the second side surface 12d. The second slant surface 16b is inclined so as to extend away from the top surface 12c in the same direction.

As in the case of the known backlight unit described with reference to FIGS. 6A and 6B, a plurality of LEDs 3 serving as light sources are disposed adjacent to the first side surface 12a serving as an incident surface. The LEDs 3 are arranged at predetermined intervals along the first side surface 12a (i.e., in the direction perpendicular to the drawing plane). FIG. 1A illustrates only one of the LEDs 3.

The reflecting prisms are designed such that the angle of the first slant surface 16a increases and the angle of the second slant surface 16b decreases as the distance thereto from the first side surface increases.

Specifically, the reflecting prisms are formed to satisfy the following formulations:

$$A(1)<A(2)<\cdots A(m-1)<A(m)\cdots A(n-1)<A(n)$$

$$B(1)<B(2)<\cdots B(m-1)<B(m)\cdots B(n-1)<B(n)$$

$$A(m)=B(m)$$

wherein $A(m)$ represents the inclination angle of the first slant surface 16a of the m-th reflecting prism from the first side surface 12a toward the second side surface 12d, $B(m)$ represents the inclination angle of the second slant surface 16b of the m-th reflecting prism from the second side surface 12d toward the first side surface 12a, and the number of the reflecting prisms between the first side surface 12a and the second side surface 12d is "n".

Figure 2:
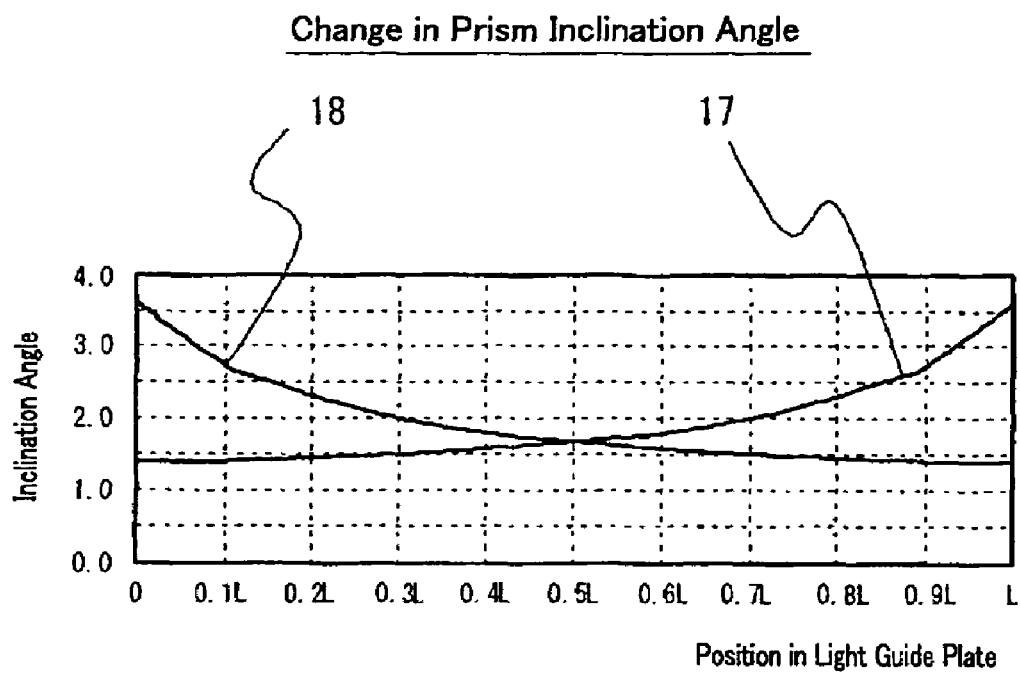
FIG. 2 is a graph showing changes in inclination angles of prisms in the light guide plate according to the embodiment of the present invention.

FIG. 2 shows an example of the actual inclination angles of the first and second slant surfaces 16a and 16b of the reflecting prisms formed in a manner as described above. In FIG. 2, the vertical axis represents the inclination angles of the first and second slant surfaces 16a and 16b, and the horizontal axis represents locations in the light guide plate 12. On the horizontal axis, the location of the first side surface 12a is indicated by 0 and the location of the second side surface 12d is indicated by L. Curve 17 represents a change in the inclination angle of the first slant surface 16a, and curve 18 represents a change in the inclination angle of the second slant surface 16b.

In the present embodiment, the inclination angles of the first and second slant surfaces 16a and 16b are set in the range of 1.4 to 3.6 degrees as shown in FIG. 2. Although the value of the inclination angle may vary depending on, for example, the size of the backlight unit to be used is not limited to a specific range, and it is preferable that the inclination angles be set in the range of 0.5 to 50 degrees. Also, it is preferable that the reflecting prisms be arranged at intervals of about 0.05 to 0.3 mm.

Figure 3:
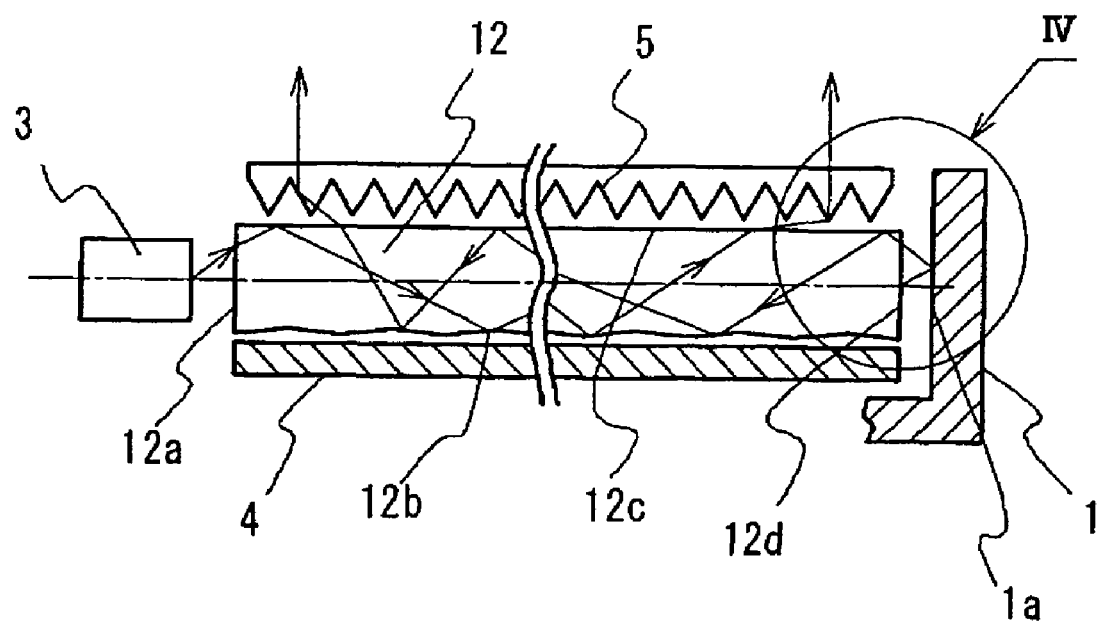
FIG. 3 is a cross-sectional view of a backlight unit including the light guide plate according to the embodiment of the present invention, and illustrates an optical path of light emitted from a light source.
Figure 4:
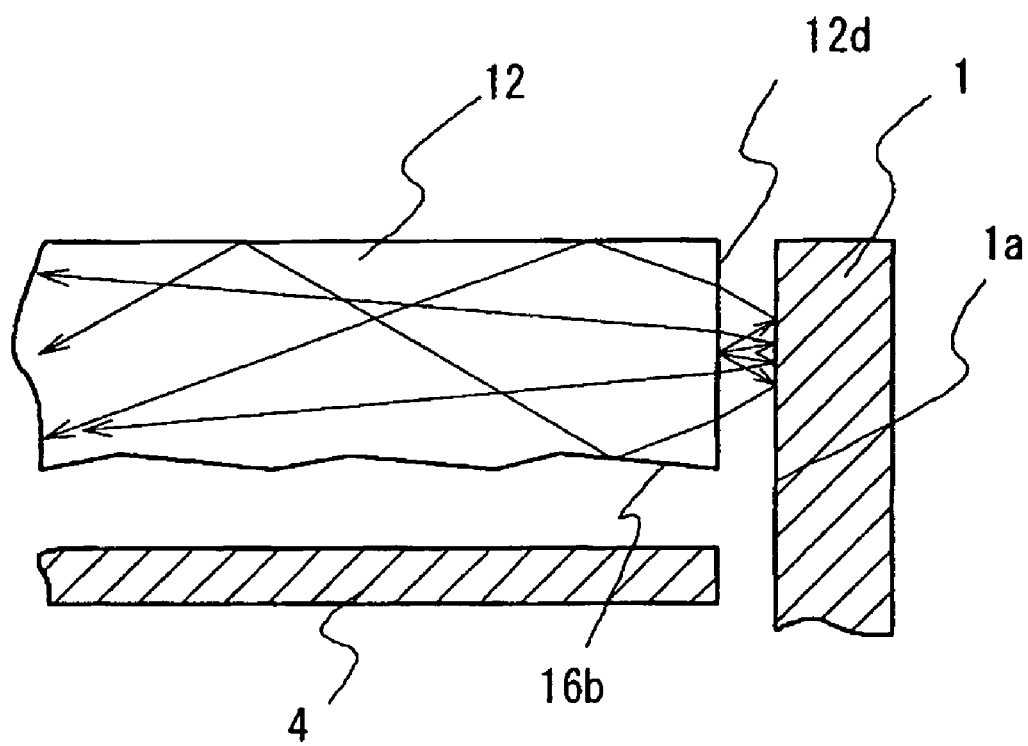
FIG. 4 is an enlarged view of portion IV of FIG. 3.

FIG. 3 illustrates an exemplary backlight unit which includes the light guide plate 12 described above. FIG. 4 is an enlarged view of portion IV of FIG. 3. An optical path of light emitted from a light source of this backlight unit will be described with reference to FIGS. 3 and 4.

The light guide plate 12 and the LEDs 3 for emitting light to the light guide plate 12 are disposed inside a housing 1 of this backlight unit. Light from each LED 3 enters the light guide plate 12 through the first side surface 12a serving as an incident surface toward the second side surface 12d. The light incident on the light guide plate 12 is repeatedly reflected on the top surface 12c and the bottom surface 12b while propagating toward the second side surface 12d. By the action of the reflection on prisms, the incident angle of the light with respect to the top surface 12c is gradually reduced. When the incident angle becomes smaller than a predetermined critical angle, the light is emitted from the top surface 12c and then directed upward by a prism sheet 5. Light having leaked from the bottom surface 12b is returned to the light guide plate 2a by a reflecting sheet 4.

A part of the light incident from the first side surface 12a reaches the second side surface 12d and exits therefrom. An inner surface 1a of the housing 1 is a mirror surface and is adjacent to the second side surface 12d. The light having exited from the second side surface 12d is reflected by the inner surface 1a, returned to the light guide plate 12 through the second side surface 12d, and propagates toward the first side surface 12a while being reflected on the top surface 12c and the bottom surface 12b.

Like the light propagating from the first side surface 12a toward the second side surface 12d, the light advancing toward the first side surface 12a is repeatedly reflected on the bottom surface 12b and the top surface 12c of the light guide plate 12 so that the incident angle of the light with respect to the top surface 12c gradually decreases. When the incident angle becomes smaller than a predetermined critical angle, the light is emitted upward from the top surface 12c. According to the embodiment, the second slant surface 16b described above allows a large part of the light returning toward the first side surface 12a from the second side surface 12d to be emitted from a portion of the top surface 12c adjacent to the first side surface 12a. Therefore, dark areas that exist in this portion of a known backlight unit are prevented from being generated, and the problem of unevenness in backlight luminance can be solved.

In the known light guide plate 2, light having passed through the surface opposite the side surface 2a is not used as backlight. However, since such light can also be used as backlight in the light guide plate 12 of the present invention, it is possible to increase the luminance of backlight.

Figure 5:
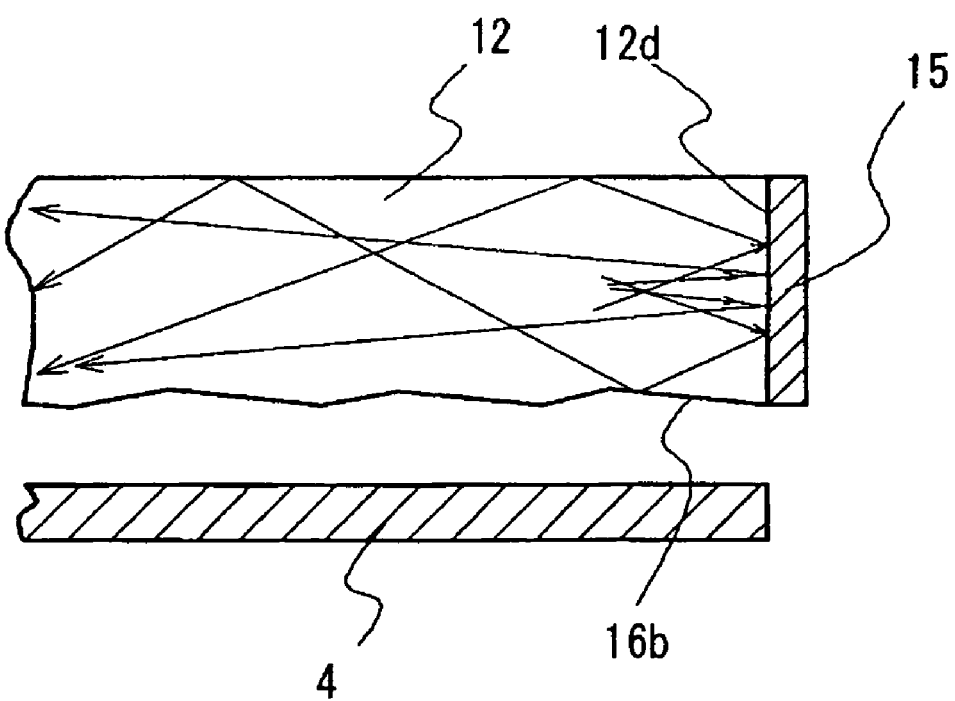
FIG. 5 illustrates an optical path in a light guide plate according to another embodiment of the present invention.

FIG. 5 illustrates another embodiment of the light guide plate according to the present invention. In this light guide plate 12, the second side surface 12d is provided with a reflective film 15 having high reflectivity thereon, instead of the provision of the reflective inner surface (mirror surface) 1a of the housing 1. It is preferable that the reflective film 15 be a thin film made of metal, such as aluminum or chromium.

The light guide plate of the present invention is widely applicable to backlight units of a variety of display devices, including liquid-crystal display devices, and illuminating devices.

Although the present invention has been described in terms of specific embodiments, it is anticipated that alternations and modifications thereof will no doubt become apparent to those skilled in the art. It is therefore intended that the following claims be interpreted as covering all such alternations and modifications as fall within the true spirit and scope of the invention.

What is claimed is:

1. A light guide plate comprising:
   a top surface serving as a light-emitting surface;
   a bottom surface serving as a reflecting surface; and
   a periphery having a first side surface serving as an incident surface and a second side surface opposite the first side surface,
   wherein the bottom surface is provided with a plurality of reflecting prisms successively arranged in a direction from the first side surface to the second side surface;
   each reflecting prism has a first slant surface inclined so as to extend toward the top surface in a direction from the first side surface toward the second side surface, and a second slant surface succeeding to the first slant surface and inclined so as to extend away from the top surface in the direction from the first side surface toward the second side surface; and
   the second slant surfaces of reflecting prisms are designed to reflect a large part of light reflected back from the second side surface toward the first side surface so that the large part of light is emitted from an area of the top surface located near the first side surface;
   wherein inclination angles of the second slant surfaces of the reflecting prisms positioned near the first side surface are larger than those of the second slant surfaces of other reflecting prisms so that the large part of light reflected back from the second side surface toward the first side surface is emitted from the area of the top surface located near the first side surface.

2. The light guide plate according to claim 1, wherein the inclination angle of the second slant surface of the reflecting prism decrease as a distance between the second slant surface and the first side surface increases.

3. The light guide plate according to claim 2, wherein an inclination angle of the first slant surface of the reflecting prism increases as a distance between the first slant surface and the first side surface increases.

4. The light guide plate according to claim 3, wherein the reflecting prism extend in parallel with the first side surface and the second side surface.

5. The light guide plate according to claim 4, wherein the reflecting prisms are formed to satisfy the following formulations:

$$A(1)<A(2)<\text{-}.A(m-1)<A(m)\text{--}A(n-1)<A(n)$$

$$B(1)<B(2)<\text{--}B(m-1)<B(m)\text{--}B(n-1)<B(n)$$

$$A(m)=B(m)$$

wherein A(m) represents the inclination angle of the first slant surface of the m-th reflecting prism from the first side surface toward the second side surface, B(m) represents the inclination angle of the second slant surface of the m-th reflecting prism from the second side surface toward the first side surface, and the number of the reflecting prisms formed between the first side surface and the second side surface is "n".

6. The light guide plate according to claim 1, wherein a reflective film is formed on the second side surface.

* * * * *